UNITED STATES PATENT OFFICE 2,065,587

VULCANIZATION OF RUBBER

Louis H. Howland, Nutley, N. J., assignor to United States Rubber Products, Inc., New York, N. Y., a corporation of Delaware No Drawing. Application March 9, 1935,
Serial No. 10,275

15 Claims. (Cl. 18—53)

This invention relates to improvements in the vulcanization of rubber and more particularly to the use of a new class of vulcanization accelerators.

An object of this invention is to provide a class of accelerators different from and commercially more desirable than compounds of the same general class which are already known. The new materials are readily prepared, are relatively stable and exhibit delayed-action characteristics which favor less scorching of the rubber on the mill.

The new accelerators are broadly N-substituted carbamyl derivatives, more particularly diarylcarbamyl derivatives of alkylated dithiocarbamic acids, the term "alkylated" referring to the replacement of both hydrogen atoms of the amino group by aliphatic radicals or groups. The materials are mixed anhydrides. They may be termed diaryl carbamyl alkylthiocarbamyl-sulphides and are believed to have the constitutional formula

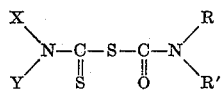

where X and Y are substituted or unsubstituted alkyl groups such as methyl, ethyl, propyl, butyl, amyl, allyl, benzyl, cyclo-hexyl, or X and Y may together form a heterocyclic ring with the nitrogen as exemplified by piperidyl, morpholyl, decahydroquinolyl, pipecolyl, etc. R and R' are similar or dissimilar aryl groups such as phenyl, tolyl, naphthyl, etc., which may be further substituted, as by alkyl, alkoxy or other radicals. Also R and R' may be joined in such manner that, together with the adjacent N atom, they form the residues of such heterocyclic bases as carbazoles, meso disubstituted acridanes, acridones, hydrogenated quinolines, etc.

The materials are prepared by reacting an N-substituted carbamyl halide with a substantially equimolecular amount of a salt of the desired dithiocarbamic acid, the reaction being carried out preferably under anhydrous conditions and, advantageously, in the presence of an inert liquid medium in which at least one of the reactants is at least partially soluble and in which the other reactant is dissolved or in suspension; for example, acetone, benzene, carbon disulfide, alcohol, or mixtures thereof.

The following example is given to illustrate the invention, with a preferred member:

Example 1.—Diphenylcarbamyl dimethyl-thiocarbamyl-sulphide.

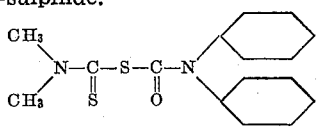

This material may be prepared as follows:—28.6 grams of dry sodium dimethyl dithiocarbamate are dissolved in 100 cc. ethyl alcohol, and to the alcoholic solution is added 46.3 grams of diphenylcarbamyl chloride dissolved in 200 cc. of ethyl alcohol. The mixture is refluxed for 15–30 minutes and then allowed to stand. From the cooled solution when mixed with excess water, there separates out a yellow solid which when recrystallized from alcohol has a melting point of 184–185° C.

A better yield of material is obtained by refluxing for about 8 hours, a mix of equimolecular proportions, e. g., 0.1 mole each of the dithiocarbamate and the carbamyl chloride, about 200 cc. acetone and about 15 cc. carbon bisulfide, thereafter distilling off the carbon bisulphide and allowing the material to crystallize from the acetone solution. The product when filtered off, washed with acetone, and washed free of sodium chloride with water and dried has a melting point of 186° C. It analyzes about 8.81% nitrogen content and 21.30% sulphur content. Diphenylcarbamyl dimethyl-thiocarbamyl sulfide is insoluble in water and somewhat soluble in alcohol, acetone and ethyl methyl ketone. It may be crystallized from these solvents. It may be used as prepared above or further purified.

This product was tested as a vulcanization accelerator in a tire tread stock of the following composition, the parts being by weight:

| | |
|---|---:|
| Smoked sheet | 100.00 |
| Carbon black | 45.00 |
| Zinc oxide | 5.00 |
| Pine tar | 3.50 |
| Zinc soaps of cocoanut oil acids | 1.25 |
| Sulphur | 3.25 |
| Acetone-diphenyl-amine condensate (antioxidant) | 1.00 |
| Accelerator | .63 | with the following results:

Scorch test

| Cure in minutes at 5 pounds per square inch steam pressure | T | E |
|---|---|---|
| 45 | No cure | |
| 60 | No cure | |
| 75 | No cure | |
| 90 | No cure | |
| 105 | 702 | 780 |
| 120 | 1525 | 667 |

Technical cures

| Cure in minutes at 25 pounds per square inch steam pressure | T | E |
|---|---|---|
| 30 | 3500 | 726 |
| 45 | 4160 | 716 |
| 60 | 4120 | 720 |
| 75 | 3480 | 636 |

T is tensile in pounds per square inch at break;
E is percent elongation at break.

*Example 2.*—Phenyl-β-naphthylcarmbamyl dimethylthiocarbamyl sulphide:

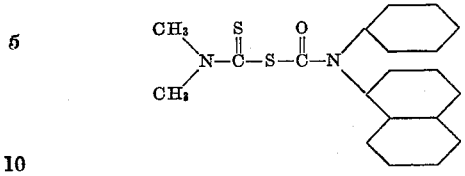

This material may be prepared as follows:

110 grams of phenyl-β-naphthyl carbamyl chloride (made by reacting phenyl-β-naphthyl amine with phosgene in benzol solution), 71.5 grams of dry sodium dimetyl dithiocarbamate, 500 cc. of dry acetone and 45 cc. carbon bisulfide are put in a 2 liter round bottom flask to which is attached a condenser and the reaction mixture is refluxed for about 4 hours. The carbon bisulfide is removed by distillation and the reaction mixture is allowed to stand at room temperature for several hours.

The yellow crystals which separate are filtered off by suction, acetone washed, and finally water washed until free of sodium chloride. The product is dried. Yield is 72 grams; M. P. is 163–165° C.; analysis showed approximately 7.48% nitrogen content, and approximately 16.45% sulfur content.

This accelerator product when tested in a tire tread stock of the following composition, the parts being by weight,

| | |
|---|---|
| Smoked sheet | 100.00 |
| Carbon black | 45.00 |
| Zinc oxide | 5.00 |
| Pine tar | 3.50 |
| Zinc soaps of cocoanut oil acids | 4.00 |
| Sulphur | 3.25 |
| Accelerator | .875 | gave the following results:

| Cure in minutes at 30 pounds per sq. in. steam pressure | T | E |
|---|---|---|
| 45 | 4331 | 710 |
| 60 | 4373 | 700 |
| 75 | 4117 | 710 |
| 90 | 3976 | 680 |

*Example 3.*—Diphenylcarbamyl pentamethylene-thiocarbamyl sulphide:

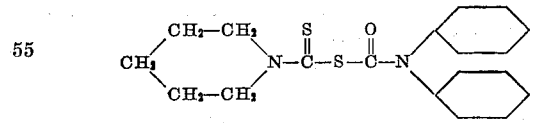

may be prepared as follows:

A mixture of 150 grams of diphenyl carbamyl chloride, 117 grams of dry potassium pentamethylene dithiocarbamate, 500 cc. acetone and 50 cc. carbon bisulfide are refluxed for 6 hours.

After cooling the reaction mixture is diluted with water. An oil separates, which is made to crystallize by washing it several times by agitation with cold alcohol to remove impurities. The yellow crystalline product remaining is then recrystallized from hot alcohol. Yield is 80 grams; M. P. is 152° C. Analysis showed approximately 7.82% N and 17.60% sulfur content.

This accelerator product when tested in a tire tread stock of the following composition, the parts being by weight,

| | |
|---|---|
| Smoked sheet | 100.00 |
| Carbon black | 45.00 |
| Zinc oxide | 5.00 |
| Pine tar | 3.50 |
| Zinc soaps of cocoanut oil acids | 4.00 |
| Sulphur | 3.25 |
| Acetone-diphenyl-amine (antioxidant) | 2.00 |
| Accelerator | 0.70 | gave the following results:

| Cure in minutes at 30 pounds per sq. in. steam pressure | T | E |
|---|---|---|
| 45 | 4418 | 750 |
| 60 | 4307 | 720 |
| 75 | 4198 | 710 |
| 90 | 4210 | 700 |

In preparing the accelerators the use of carbon bisulphide is not indispensable but better yields are obtained in its presence. It is believed that it suppresses the formation of substituted ureas. Instead of acetone other inert solvents such as ethyl methyl ketone may be used. The proportions of reactants may be varied, for example an excess of the diarylcarbamyl chloride may be used above the theoretically required amount. Also other times, temperatures and conditions of reaction may be employed. The dry salt of the dithiocarbamate to be reacted may be prepared in various ways, an easy way being to evaporate an aqueous solution thereof under vacuum on a steam bath until substantially all the water is removed.

Examples of other materials that may be used as vulcanization accelerators are compounds like diphenylcarbamyl dimethylthiocarbamyl sulfide in which the diphenylcarbamyl grouping is replaced by ditolylcarbamyl, phenyl tolyl carbamyl, phenyl xylyl carbamyl, dicumyl carbamyl, dinaphthylcarbamyl, phenyl naphthyl carbamyl, tolyl naphthyl carbamyl, xylyl naphthyl carbamyl, dichlorodiphenylcarbamyl, dianisyl carbamyl, diphenetidylcarbamyl, dibiphenylcarbamyl, carbamyl grouping from decahydroquinoline, carbamyl grouping from acridanes (dihydro acridines) or meso disubstituted acridanes, carbamyl grouping from acridones, or a carbamyl grouping from a carbazole. With or without making any of the said changes in the diphenylcarbamyl group, the dimethyl thiocarbamyl group may be replaced by diethylthiocarbamyl, dipropyl thiocarbamyl, dibutylthiocarbamyl, diamylthiocarbamyl, methyl ethyl thiocarbamyl, ethyl amyl thiocarbamyl, dicyclohexyl-thiocarbamyl, cyclohexyl ethyl thiocarbamyl, pentamethylene-thiocarbamyl, dibenzyl thiocarbamyl, benzyl methyl thiocarbamyl, the thiocarbamyl grouping from hydrogenated quinolines, the thiocarbamyl grouping from morpholine or the thiocarbamyl grouping from pipecoline.

The accelerators of this invention may be used in conjunction with other accelerators and activators, such as mercaptoarylenethiazoles and their derivatives, ammonia, organic bases and salts thereof, etc. For example, accelerator compositions comprising a diarylcarbamyl thiocarbamyl sulphide and mercaptobenzothiazole have been found to be particularly advantageous, in that the combination is effective in amounts considerably smaller than the amount of the thiazole which is required when it is used as the sole accelerator, and the scorching or prevulcanizing tendency of the combination is less than that of either ingredient alone when used in normal amounts. The same has been found for combinations of diarylcarbamyl dithiocarbamates and dibenzothiazyl disulfide.

This is illustrated by the following example:

*Example 4.*—To separate portions A, B, C, and D respectively of a tire tread stock of the following composition:

| | Parts |
|---|---|
| Smoked sheet | 100.00 |
| Carbon black | 45.00 |
| Zinc oxide | 5.00 |
| Pine tar | 3.50 |
| Zinc soap of cocoanut oil acids | 4.00 |
| Sulphur | 3.00 | amounts of accelerator were added per 100 parts of rubber as follows:

Stock A—1.125 parts of mercaptobenzothiazole
Stock B—0.750 parts of diphenylcarbamyl dimethylthiocarbamyl sulphide
Stock C—{0.5 parts of mercaptobenzothiazole
0.2 parts of diphenylcarbamyl dimethylthiocarbamyl sulphide
Stock D—{0.5 parts of dibenzothiazyl disulphide
0.2 parts of diphenylcarbamyl dimethylthiocarbamyl sulphide The stocks were cured in the usual manner.

*Scorch test*

| Cure in minutes at 5 pounds per sq. in. steam pressure | A | | B | | C | | D | |
|---|---|---|---|---|---|---|---|---|
| | T | E | T | E | T | E | T | E |
| 120 | 1583 | 590 | 2808 | 670 | 928 | 600 | 652 | 650 |

*Technical cures*

| Cure in minutes at 30 pounds per sq. in. steam pressure | A | | B | | C | | D | |
|---|---|---|---|---|---|---|---|---|
| | T | E | T | E | T | E | T | E |
| 60 | 4328 | 530 | 4289 | 540 | 4130 | 590 | 4450 | 550 |
| 75' | 4325 | 510 | 4058 | 530 | 4570 | 590 | 4088 | 510 |
| 90' | 4560 | 510 | 4211 | 550 | 4244 | 580 | 4179 | 510 |
| 180' | 4048 | 460 | 3843 | 540 | 4081 | 490 | 3910 | 490 |

The accelerators may be introduced into the rubber in any known manner, as by incorporating them on a mill in the dry form or in solution, or by diffusion from a surrounding liquid medium which may also act as the vulcanizing medium, etc.

The accelerators may be used in other desired amounts different from that shown and with other compounding ingredients and other proportions of ingredients, and in any type of rubber stock.

The term rubber is to be construed broadly as including caoutchouc, balata, gutta percha, rubber isomers or synthetic rubber in either solid or liquid form, and is applicable to latex whether naturally occurring or artificially prepared.

Having thus described my invention, what I claim and desire to protect by Letters Patent is:

1. A process of producing a vulcanized rubber product which comprises vulcanizing rubber in the presence of a diarylcarbamyl dialkylthiocarbamyl sulphide.

2. A process of producing vulcanized rubber products which comprises incorporating in rubber a vulcanizing agent and a diarylcarbamyl dialkylthiocarbamyl sulphide.

3. A process of producing vulcanized rubber products which comprises incorporating in rubber a vulcanizing agent and a diphenylcarbamyl dialkylthiocarbamyl sulphide.

4. A process of producing vulcanized rubber products which comprises incorporating in rubber a vulcanizing agent and a diphenylcarbamyl dimethylthiocarbamyl sulphide.

5. A process of producing vulcanized rubber products which comprises incorporating in rubber a vulcanizing agent and diphenylcarbamyl pentamethylene thiocarbamyl sulphide.

6. A process of producing vulcanized rubber products which comprises incorporating in rubber a vulcanizing agent and an accelerator mixture comprising a diarylcarbamyl dialkylthiocarbamyl sulfide and vulcanizing the rubber.

7. A process of manufacturing a vulcanized rubber product which comprises heating rubber and a vulcanizing agent in the presence of an accelerating agent comprising a benzothiazyl sulphide accelerator and a diarylcarbamyl dialkylthiocarbamyl sulfide.

8. A process of manufacturing a vulcanized rubber product which comprises heating rubber and a vulcanizing agent in the presence of an accelerating agent comprising a mercaptobenzothiazole and a diarylcarbamyl dialkylthiocarbamyl sulphide.

9. A process of producing vulcanized rubber products which comprises incorporating in rubber a vulcanizing agent and a diarylcarbamyl dialkylthiocarbamyl sulfide wherein the alkyl groups may be further joined together through carbon or oxygen and wherein the aryl groups may be joined together, and vulcanizing the rubber.

10. An accelerator compound which is a diarylcarbamyl dialkylthiocarbamyl sulfide wherein the alkyl groups may be further joined together through carbon or oxygen and wherein the aryl groups may be joined together.

11. A rubber composition comprising rubber and a diarylcarbamyl dialkylthiocarbamyl sulfide wherein the alkyl groups may be further joined together through carbon or oxygen and wherein the aryl groups may be joined together.

12. A vulcanization accelerator which is a diarylcarbamyl dialkylthiocarbamyl sulphide.

13. A vulcanization accelerator which is a diphenylcarbamyl pentamethylene thiocarbamyl sulphide.

14. A rubber product resulting from the process as set forth in claim 1.

15. A rubber product resulting from the process as set forth in claim 9.

LOUIS H. HOWLAND.